United States Patent [19]
Cosgrove et al.

[11] Patent Number: 6,070,013
[45] Date of Patent: May 30, 2000

[54] TRANSMOGRIFYING PHOTOGRAPHY SYSTEMS, FILM PACKAGES, AND CAMERAS

[75] Inventors: Patrick A. Cosgrove, Honeoye Falls; Kenneth A. Parulski, Rochester, both of N.Y.

[73] Assignee: Eastman Kodak Company, Rochester, N.Y.

[21] Appl. No.: 09/157,194

[22] Filed: Sep. 18, 1998

[51] Int. Cl.[7] .................................................. G03B 17/02
[52] U.S. Cl. ............................. 396/6; 396/311; 396/378; 396/429
[58] Field of Search .................................. 396/311, 315, 396/319, 321, 429, 378, 380, 381, 6; 355/40, 41; 358/909.1; 348/64, 333, 334

[56] References Cited

U.S. PATENT DOCUMENTS

| | | |
|---|---|---|
| 4,345,825 | 8/1982 | Matteson et al. . |
| 4,423,934 | 1/1984 | Lambeth et al. . |
| 5,142,310 | 8/1992 | Taniguchi et al. . |
| 5,189,453 | 2/1993 | Boyd . |
| 5,300,974 | 4/1994 | Stephenson, III . |
| 5,504,583 | 4/1996 | Jamzadeh et al. . |
| 5,587,752 | 12/1996 | Petruchik . |
| 5,606,365 | 2/1997 | Maurinus et al. . |
| 5,619,737 | 4/1997 | Horning et al. . |
| 5,619,738 | 4/1997 | Petruchik et al. . |
| 5,640,201 | 6/1997 | Inuiya . |
| 5,701,529 | 12/1997 | Yokonuma et al. . |
| 5,701,530 | 12/1997 | Fujino . |
| 5,726,737 | 3/1998 | Fredlund et al. . |
| 5,739,922 | 4/1998 | Matama . |
| 5,742,855 | 4/1998 | Saito et al. . |
| 5,758,216 | 5/1998 | Arnold . |
| 5,761,558 | 6/1998 | Patton et al. . |
| 5,799,219 | 8/1998 | Moghadam et al. . |

FOREIGN PATENT DOCUMENTS

| | | |
|---|---|---|
| 0 821 265 A1 | 1/1998 | European Pat. Off. . |
| 9-179250 | 7/1997 | Japan . |
| 10-115874 | 5/1998 | Japan . |
| 10-115875 | 5/1998 | Japan . |

OTHER PUBLICATIONS

1998 Nintendo Brochure, "Funtography".

*Primary Examiner*—Howard B. Blankenship
*Attorney, Agent, or Firm*—Robert Luke Walker

[57] ABSTRACT

An image capture package, such as a one-time use camera, has a capture member bearing an encodement for an image transmogrification. The capture member captures images free of the image transmogrification. The image capture package has a sighting guide associated with the capture member. The sighting guide identifies a region of the captured images that is subject to the image transmogrification. A photography system includes a plurality of the image capture packages and a processing system that digitally modifies the captured images responsive to respective encodements.

30 Claims, 5 Drawing Sheets

TRANSMOGRIFYING PHOTOGRAPHY SYSTEMS, FILM PACKAGES, AND CAMERAS

CROSS REFERENCE TO RELATED APPLICATIONS

Reference is made to commonly assigned, co-pending U.S. patent applications Ser. No. 09/157,195 entitled: CAMERA AND PHOTOGRAPHY SYSTEM WITH MULTIPLE, ENCODED AREA MODES AND MODIFICATION STATES, filed in the name of Kenneth A. Parulski; U.S. patent application Ser. No. 09/156,681 entitled: CAMERA HAVING LOCATOR FOR IMAGE MODIFICATION AREAS, filed in the name of Kenneth A. Parulski, each of which is hereby incorporated herein by reference.

FIELD OF THE INVENTION

The invention relates to photography and photographic systems and more particularly relates to transmogrifying photography systems, film packages, and cameras.

BACKGROUND OF THE INVENTION

The verb "transmogrify" has been defined as changing or altering greatly and often with grotesque or humorous effect. This term and like terms are used herein to refer to an alteration in an image that is obvious on first viewing, but is not so great in scope as to eliminate most or all of the information content in an original image. A caricature is, in effect, a transmogrification of a realistic portrait. As used herein, "transmogrify" is also exclusive of simple photomontage, that is, adding one or more images to the captured image as an appendage, underlay, overlay, or semi-transparent layer.

The term "one-time use camera" is used herein to refer to cameras that are provided to consumers in preloaded form and cannot be reloaded, by the consumer, without extensive camera disassembly, or replacement of parts, or use of special tools, or the like. One-time use film cameras are widely available at this time. Digital one-time use cameras are limited at this time, for cost reasons, to use in controlled situations in which it can be assured that the used camera will be returned to the dealer or manufacturer for reloading.

It is ordinarily the object of photography to make printed or displayed images that reproduce a visual image. Images are sometimes transmogrified for creative purposes, either at the time of capture using a modified optical system; or after capture by digital or physical manipulation of the captured image. The use of filters and other optical modifiers is well known, but it requires considerable skill to control a desired effect. In many cases, it is very difficult, or expensive or both, to optically modify only a local area of an image. Optical modifiers do have the advantage, with through the lens viewfinders and the like, of providing immediate visualization of modifications.

Digital image modification software is widely available that allows a user to modify a digital image. An example of such software is marketed as Kai Power Goo by MetaCreations Corp. of Carpinteria, Calif. The digital image modification software can modify digital images, by causing aberration or remapping colors or both, globally or locally as desired. Local areas and specific modifications are easily identified during editing. Such image modification software requires the use of a computer, expertise on the part of the user, and some means of both inputting a digital image and outputting the modified image in print media or other form. It is generally very easy, with such software, to either make a minor change or to work a very great alteration that turns a realistic photograph into a work of abstract art. It is generally much more difficult to obtain a controlled result. Thus, in view of this and the costs involved, digital image transmogrification is not suitable for a great many casual photographers. Digital image modification software also presents the problem that the image editing is completely separate from image capture. If a user wants to capture images appropriate for a particular transmogrification, then the user must mentally visualize the modified image while shooting the picture.

A variety of photographic film systems have been described, for example, in U.S. Pat. Nos. 4,650,304; 4,583,831; 5,059,993; 5,619,738; and 5,132,715, in which images are automatically zoomed to a greater magnification or cropped (use of only part of the image) or both during processing, based on a predetermined or selected encodement. (The term "processing" used herein, refers to the preparation of prints or other viewable images and is inclusive of printing, unless the context indicates otherwise.) In the Advanced Photo System™ (APS™), latent images are captured in a standard format (also referred to as "H" format) and are printed in that format or are printed in one of two other formats (referred to as "C" and "P"), depending upon a magnetic or optical encodement on the film.

Cameras commonly have viewfinder masks or markings to indicate to the user the dimensions of the selected photograph. Viewfinders and viewfinder components which aid in capturing non-standard images are described, for example, in U.S. Pat. Nos. 4,583,831; 4,650,304; 5,587,755; 5,619,737; 5,619,738; and U.S. Re. Pat. No. 32,797. Such masks are fixed for single mode one-time use cameras, which have external indicia indicating the particular mode. The masks are movable between different masking positions for multiple mode reusable and one-time use cameras. The cameras have indicia to inform the user of a selected mode.

U.S. Pat. No. 5,758,216 discloses photography systems, film packages, and cameras in which a one-time use camera or film package bears external indicia of a special promotion and the enclosed film has a corresponding magnetic encodement. Disclosed special promotions include photomontages (composite images) with pre-exposed or digitally superimposed cartoon characters and other symbols, super saturated color processing and enhanced size prints. The viewfinder of the one-time use camera can be modified to indicate the position of the cartoon character or the like in the photomontaged final prints. An overlay can be provided to temporarily modify the viewfinder of a reusable camera. The composited images of U.S. Pat. No. 5,758,216 discard part of the field of view of the camera (by masking or digital manipulation) and replace the discarded part with a predetermined image component. The non-replaced part of the resulting image is orthoscopic, within the limits of the imaging system.

The zoomed and cropped and composited final images just described are realistic, that is, within the quality tolerances of the equipment used, the final images do not markedly differ from visible images reflected or transmitted from the subject matter photographed. In the case of composite images, two photographic exposures are physically combined by masking the second exposure or the same effect is produced digitally, but both images are realistic prior to photomontage (or in the case of a digital component would be realistic if viewed from a display or printout). The resulting final images are realistic. Part of the original image is discarded either by masking part of the image during capture or physically or digitally removing part of the image during processing. Masking can be provided by a translucent feature such that two superimposed features appear in the final image. These types of image modification that zoom, crop, rotate, or photomontage, or do some combination of these; but do not otherwise alter the non-discarded image information; are referred to herein as "orthoscopic modifications". (Image reduction rather than enlargement is uncommonly used, but is also within the scope of "orthoscopic modification". In this case, the discarded information is uniformly distributed over the image within the limits of film grain, printer resolution, and the like.) Other modifications that alter non-discarded image information, such as image aberration and color remapping, are categorized herein as "non-orthoscopic modifications". Transmogrifications are, necessarily, non-orthoscopic modifications.

U.S. Pat. No. 5,726,737 discloses photography systems, film packages, and cameras in which a one-time use camera or film package bears external indicia of a preferential subject matter; such as action shots, scenic shots, and close-ups; and the enclosed film has a corresponding magnetic encodement. U.S. Pat. Nos. 5,758,216 and 5,726,737 disclose non-orthoscopic image modification of the entire image to provide for super saturated prints and preferential subject matter respectively. U.S. Pat. No. 5,461,440 discloses non-orthoscopic image modification that uses an encodement on film and corrects for particular image quality degradations.

U.S. Pat. No. 5,323,204 discloses use of an encodement to provide changes in aspect ratio and indicates that encodements might permit enhancement of image quality beyond negative quality to compensate for film or camera based limitations, artifacts, or errors. Examples of enhancements are noise suppression, sharpness enhancement, and tone scale modification.

It would thus be desirable to provide photography systems, film packages, and cameras which provide for easy, convenient, and predictable transmogrification of a photographed image, without requiring the user to modify a digital image.

SUMMARY OF THE INVENTION

The invention is defined by the claims. The invention, in its broader aspects, provides an image capture package, such as a one-time use camera, and a photography system. The image capture package has a capture member bearing an encodement for an image transmogrification. The capture member captures images free of the image transmogrification. The image capture package has a sighting guide associated with the capture member. The sighting guide identifies a region of the captured images that is subject to the image transmogrification. The photography system includes a plurality of the image capture packages and a processing system that digitally modifies the captured images responsive to respective encodements.

It is an advantageous effect of at least some of the embodiments of the invention that photography systems, film packages, and cameras are disclosed which provide for which provide for easy, convenient, and predictable transmogrification of a photographed image, without requiring the user to modify a digital image.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
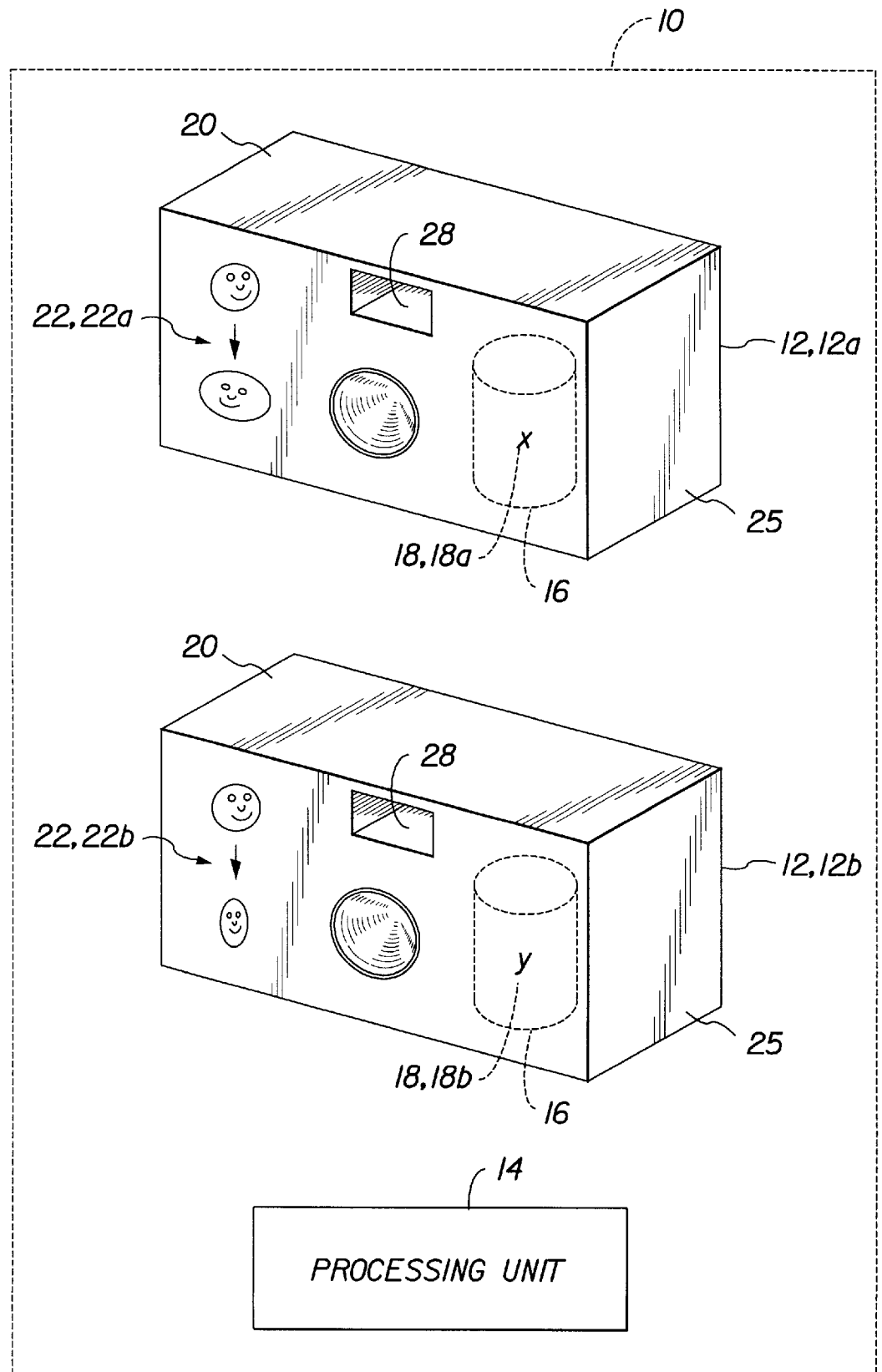
FIG. 1 is a semi-diagrammatical view of an embodiment of the system of the invention. The system includes a pair of packages of the invention. In this embodiment, the packages are one-time use cameras.
Figure 2:
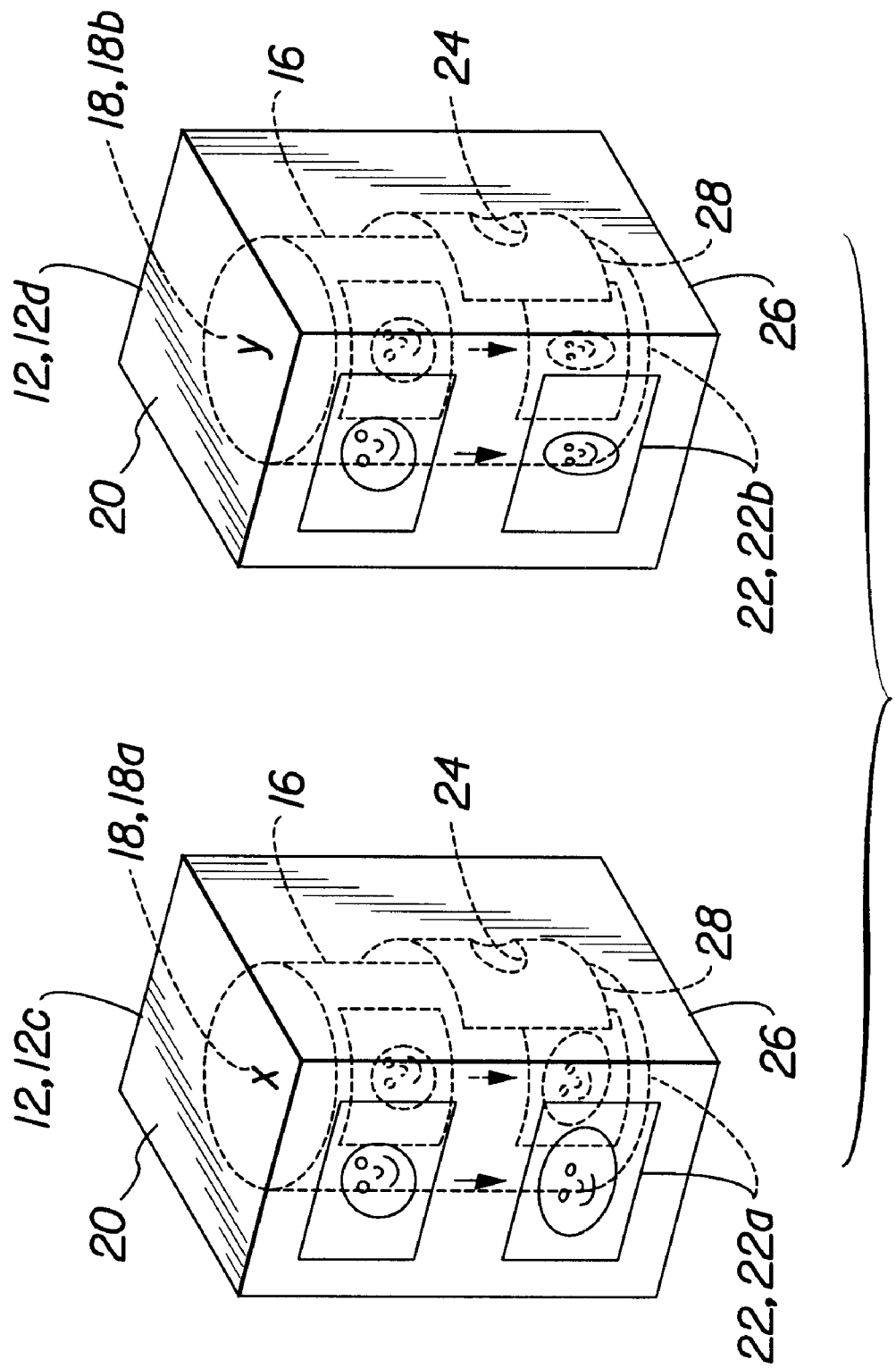
FIG. 2 is a semi-diagrammatical view of another embodiment of the packages of the invention. In this embodiment, the packages are film packs.

Referring to FIG. 1, a transmogrifying photography system 10 includes a plurality of image capture packages 12 and a processing unit 14 for those packages 12. The image capture packages 12 are one-time use cameras, as shown in FIG. 1 or film packs for reloadable cameras, as shown in FIG. 2. The packages 12 each have a capture member 16 for capture of a series of images in a conventional manner, that is, without transmogrification. The processing unit 14 processes the captured images responsive to prerecorded encodements 18 on the capture members 16 to provide transmogrified final images. The packages 12 each also have an information carrier 20 physically associated with the capture member 16. The information carriers 20 carry indicia 22 directly readable by the user prior to picture taking, that indicate the nature of the transmogrification. The packages 12 each also have a sighting guide, discussed in detail below, that identifies a region of the captured images subject to transmogrification.

Each package 12 is illustrated in FIG. 1 by a single unit, labelled 12a and 12b, respectively. In production, each package 12 would be produced in vast multiples of units. Two packages 12 are illustrated in FIG. 1. The number of different packages 12 in the system 10 is not critical. A system having one package would not be very advantageous. A system having a very large number of packages would not be likely to be economically viable. A currently preferred number of packages is in the range of from 2 to about 10. For convenience, each package 12 is generally described herein in terms of an individual unit.

The capture member 16 is photographic film, in the form of a filmstrip or otherwise, with or without a cassette or other holder; or, alternatively, a digital information storage structure, such as a flash memory card or floppy diskette. The capture members 16 each store captured images and bear a prerecorded machine readable encodement 18 for an image transmogrification. The capture members 16 are conventional and the images are captured free from image transmogrification. The captured images are then altered by the processing unit 14, during the preparation of final images responsive to the encodements 18 on the individual capture members 16. The term "final image" is used herein to generically refer to the preparation of a viewable image from a latent image or captured digital image. The viewable image can be a hard copy image such as a photographic print or a digital image subject to display or printing using appropriate software.

The nature of the encodement 18 is not critical. For example, encodements can be recorded magnetically on magnetic recording media or magnetic recording regions, such as a magnetic recording region of an APS™ filmstrip; optically as latent images or changes in optical storage media; electronically in digital memory; by physical marking such as abrading or inking; or by other means. With digital capture members 16, it is preferred, for ease of use, that encodements be recorded so as to be readable from the capture member 16 in the same manner as the captured images. With film capture members 16, the encodements can conveniently be recorded in magnetic, optical, or digital form on a film holder or can conveniently be recorded as latent images on the film or magnetically on a magnetic layer or area of the film. The encodement 18 can be repeated for each captured image or a single encodement can be provided for all the images in a capture member 16. The encodements 18 are readable by automated equipment. The encodement 18 can refer to a look-up table for instructions, or can supply one or more variables in a formula, or can provide complex instructions. A referenced look-up table can be part of the processor or can be remotely accessed through a network.

The information carrier 20 can be any medium capable of carrying the indicia 22. The information carrier 20 can be an item of packaging, such as a carton or label or insert, that is physically associated with the capture member 16 in a manner that allows separation after the package 12 is purchased. It is preferred, however, that the information carrier 20 be inseparable from the capture member 16 prior to image capture. This helps reduce the possibility of the user mixing up capture members and unintentionally obtaining transmogrified images when realistic images or otherwise transmogrified images are intended. For example, the information carrier 20 can be a permanently affixed label or a portion of the capture member. In FIG. 1, each information carrier 20 is a portion of the case 25 of the respective camera 12a, 12b. In FIG. 2 the packages 12b, 12c each have a first information carrier 20 that is a portion of the capture member 16. A second information carrier 20 is a portion of an outer carton 26.

Figure 3:
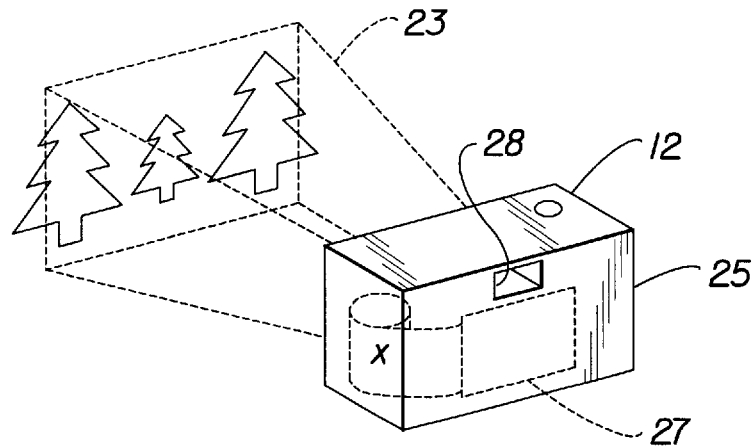
FIG. 3 is a semi-diagrammatical view illustrating use of one of the cameras of FIG. 1.

Referring now to FIGS. 1–3, the information carriers 14 of packages 12a and 12c each bear indicia 22a (symbolized in FIGS. 1–2 by an "x") of a first transmogrification. The capture members 16 of the packages 12a and 12c each bear a machine readable encodement 18a for the same transmogrification. Packages 12b and 12d differ from the other packages in having indicia 22b and encodements 18b for a second transmogrification. The first and second transmogrifications differ, respective encodements 18a, 18b also differ. Each unit of a particular package bears the same image transmogrification and encodement as other units of the same package.

It is preferred that the indicia 22 identify to the user the nature of the transmogrification. For example, indicia 22a identifies the distortion of a circular region of the captured image into the shape of a horizontally oriented ellipse. Indicia 22b identifies the distortion of a circular region of the captured image into the shape of a vertically oriented ellipse. The nature of the indicia 22 used is not critical. The indicia 22 can be words, alphanumeric characters, symbols, or pictorial representations. Indicia 22 on different units of a particular package 12 can differ, but should present the same meaning to the user.

The image transmogrifications alter a region of the captured image so as to retain some of the image content in that region, but change the rest of the information content in that region. Image transmogrifications thus do not include zooming, cropping, and photomontage, replacement of a region of one image by another or simple addition of one image on top of another. Image transmogrifications thus transform the subject matter of an image. For most uses, subtle effects are undesirable. Examples of suitable localized effects include image aberration, particularly in the form of anamorphic distortion, and color remapping. Various effects can be combined, such as distortion with one or more of image inversion, color remapping, and photomontage.

The sighting guide 24 identifies a region of the captured images subject to the image transmogrification. (The region is the same for all the captured images for a particular package.) The region can be the entire image, but it is highly preferred that the region is a portion of the image. The sighting guide 24 can be a pictorial representation or other indication of the region of image transmogrification placed on the information carrier in the same manner as the indicia, but this is not preferred. It is preferred that sighting guide 24 appear in the viewfinder field of the camera capturing the images.

In the packages 12, each sighting guide 24, is physically associated with the capture member 16. Referring now to FIGS. 1 and 3–5, the one-time use cameras 12a, 12b each have a taking lens that images a light image (indicated by dashed lines 23 on an image plane 27 at the capture member 16. The cameras 12a, 12b each have a viewfinder 28 that defines a field of view corresponding with the image plane 27. The sighting guide 24 is a line pattern or other demarcation that is part of a reticle or window 30 of the viewfinder 28 and is aligned with the region of transmogrification. FIG. 5 illustrates a final image 29 that shows the results of the transmogrification. With the one-time use cameras, the reticle 30 is fixed in the viewfinder 28. With the film packages 12c, 12d, the reticle 30 is a similarly configured transparent overlay that is packed with the capture unit, as shown in FIG. 2. The reticle 30 is attached to a camera viewfinder, by adhesion or use of a fastener (not shown) and is used with the capture member 16. The sighting guide 24 can also be a computer program or program subunit for a digital representation in a digital viewfinder or on a digital display imposed on an optical viewfinder field. The supporting programmed microprocessor or other controller can also be included in the package 12 or can be provided as part of a reloadable camera.

Figure 4:
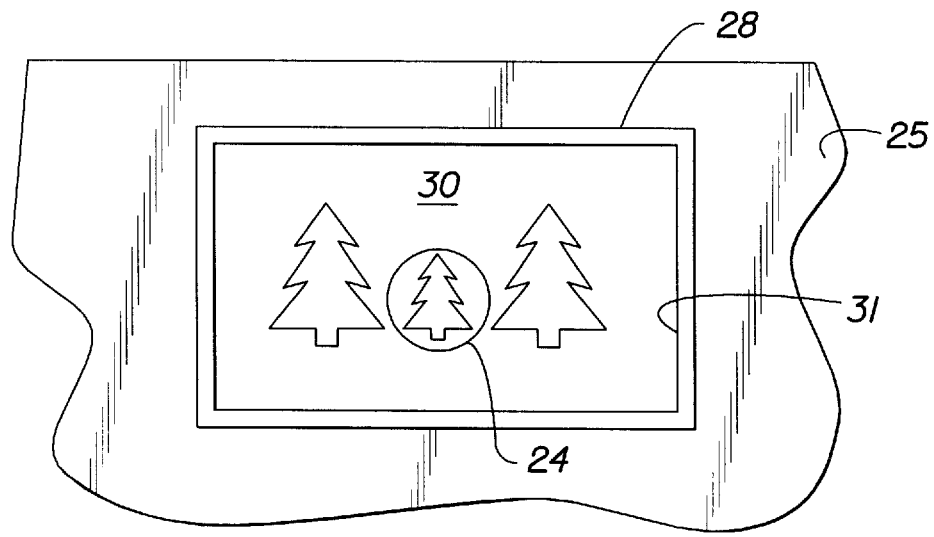
FIG. 4 is an enlarged back view of the camera of FIG. 3 showing the viewfinder and sighting guide.
Figure 5:
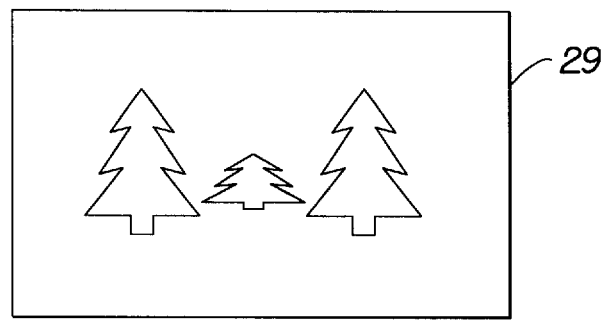
FIG. 5 is a semi-diagrammatical view of a final image produced by the camera of FIG. 3.
Figure 6A:
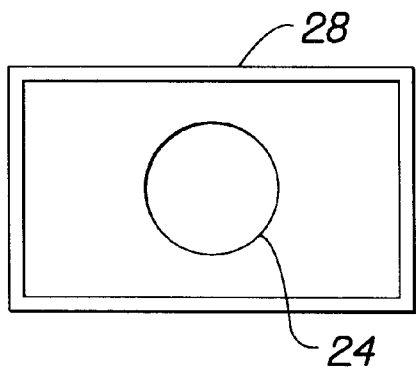
FIGS. 6a–6f are semi-diagrammatical views of viewfinders and sighting guides of other embodiments of the camera of the invention.
Figure 6B:
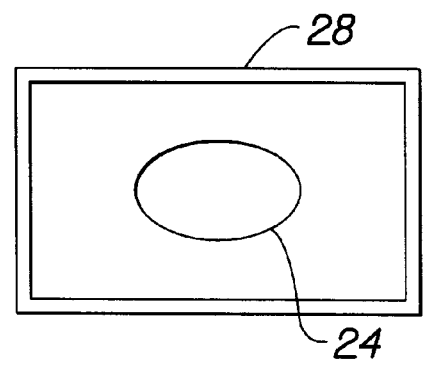
Figure 6C:
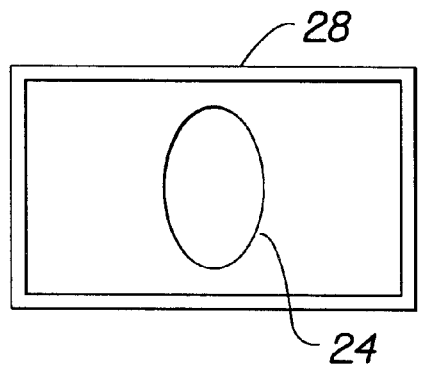
Figure 6D:
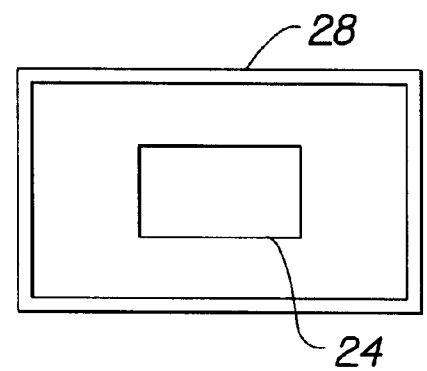
Figure 6E:
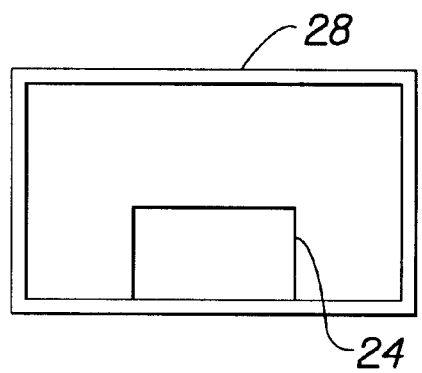
Figure 6F:
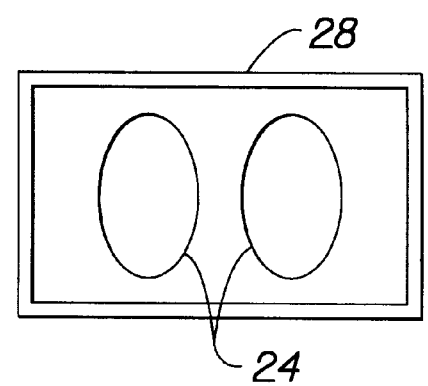

The sighting guide 24, as shown in FIGS. 3–4 is used to compose the region subject to transmogrification in the overall picture to be captured. The image within the sighting window is viewable. This is important, because the user must, in effect, compose two pictures prior to exposure. The part of the image to be transmogrified must be composed in the sighting guide 24 and the part of the image to remain unaltered must be composed in the background region. For this reason, an opaque or otherwise non-viewable sighting window would be highly undesirable. FIGS. 3–5 show the composing of an image with a particular feature centered in the sighting guide 24 and the resulting final image.

The viewfinder 28 and reticle 30 each define a periphery 31, which, at least during use of the reticle, is the outer boundary of the viewfinder field of view. The sighting guide 24 is located inside the periphery 31, and is preferably inset from the periphery 31. In most cases, the impact of a transmogrified final image upon a viewer is a function of the viewer's ability to quickly notice both the transmogrified subject matter and the remainder of the image as a frame of reference for the alteration. It is thus, as an ordinary practice, preferred that the transmogrified region be central in the final image. In the absence of cropping, this requires that the sighting guide 24 be central in the field of view of the viewfinder 28.

The sighting guide 24 can define a region of any shape, but, for ordinary use, it is preferred that the region have a simple shape, such that subject matter photographed in the region has roughly the shape of the region. For example, FIGS. 6a–6f illustrate regions that have shapes that are: circular, centered-horizontal elliptical; centered-vertical elliptical; centered-rectangular; bottom-rectangular; and paired, vertical elliptical. In FIGS. 6a–6d, the subject regions are all centered and fully surrounded by respective background regions. This is preferred for ease of use, but non-centered subject regions and multiple subject regions can also be used, as shown, for example in FIGS. 6e–6f.

Figure 7:
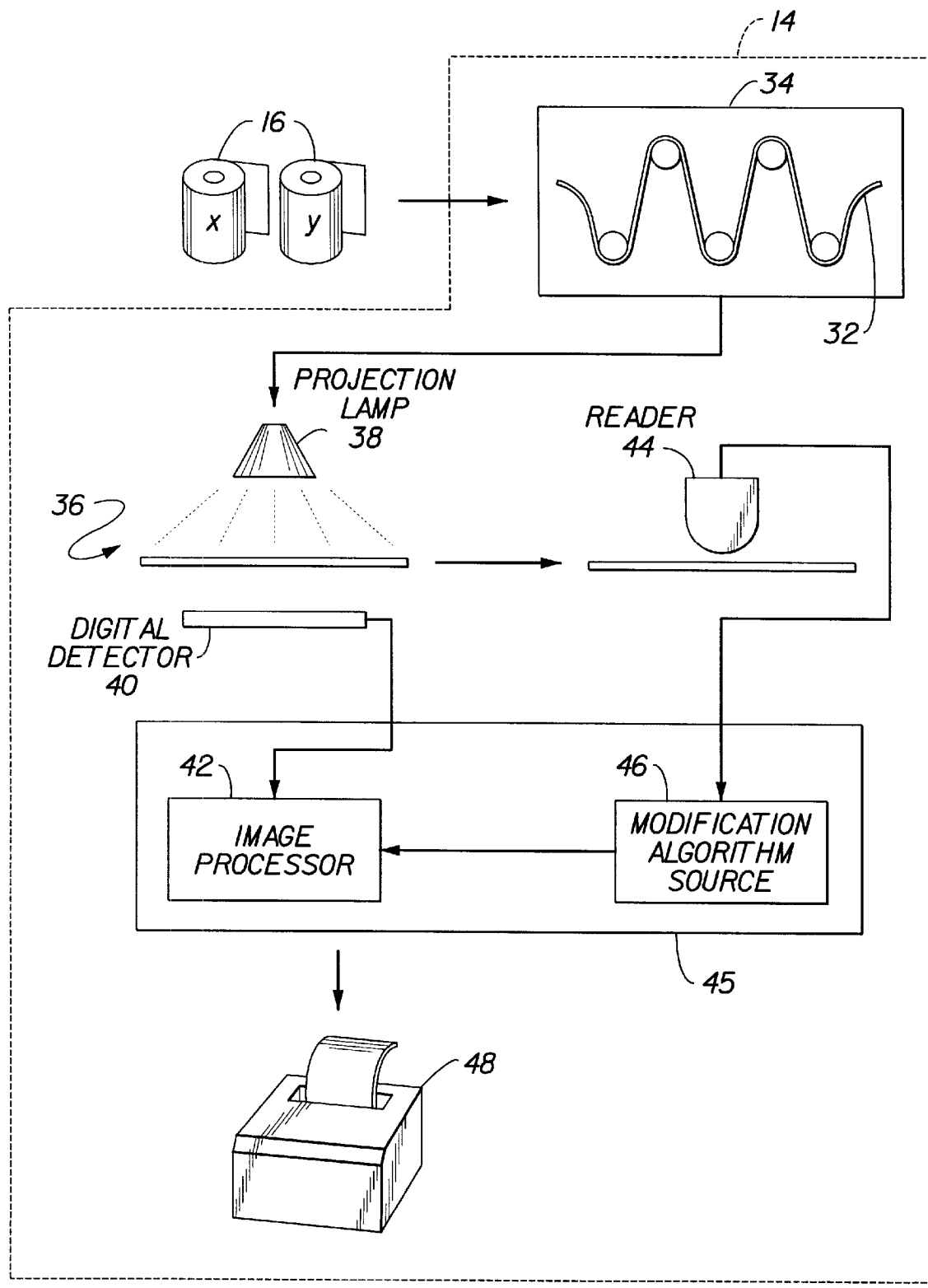
FIG. 7 is a semi-diagrammatical view of the processing unit of FIG. 1 and capture members of the packages of FIG. 1. The processing unit is indicated by a dashed line.

Referring to FIG. 7, the processing unit 14 visualizes the captured images as final images after digital modification in accordance with the encodements on the capture members 16. The processing unit 14 can be a unitary apparatus or can be composed of several discrete components. Transfer of film and digital information can be by any convenient means including the use of local and remote computer networks. The processing unit 14 and its method of operation are illustrated for capture members 16 in the form of cassettes of photographic film. A processing unit 14 for use with digital capture members 16 is comparable, but does not require components for image digitization.

Capture units 16 are collected and the film 32 is developed in a film developer 34 to visualize the latent captured images on the film as film images. The film images are then digitized in a digital input unit 36 (illustrated in FIG. 7 as a projection lamp 38 and digital detector 40) to generate a series of digital images corresponding to the film images. The digital images are sent to an image processor 42. For each digital image, the alteration setting is read by a reader 44 and a corresponding setting signal is sent to a modification algorithm source 46, which communicates an appropriate image alteration signal to the image processor 42. The image processor 42 and modification algorithm source 46 can both be provided by a programmable computer 45. The image processor 42, responsive to respective image alteration signals, digitally modifies the digital images in accordance with the image modification states and area modes and sends an output signal to an output device 48 (illustrated in FIG. 16b as a printer). The display or hard copy from the output device 48 exhibits a final image in accordance with the alteration setting.

The invention has been described in detail with particular reference to certain preferred embodiments thereof, but it will be understood that variations and modifications can be effected within the spirit and scope of the invention.

What is claimed is:

1. An image capture package comprising:
   a capture member bearing an encodement for an image transmogrification, said capture member capturing images free of said image transmogrification; and
   a reticle associated with said capture member, said reticle having a sighting guide demarcating at once and the same time a transmogrification region of said images subject to said image transmogrification and a background region of said images free of said image transmogrification.

2. The image capture package of claim 1 wherein said sighting guide is a line pattern.

3. The image capture package of claim 1 further comprising a viewfinder and wherein said reticle is fixed in said viewfinder.

4. The package of claim 1 wherein said reticle defines a field of view for said images, said field of view having a periphery, said sighting guide being inset from said periphery.

5. The package of claim 1 wherein said regions are viewable through said reticle.

6. The package of claim 1 wherein said sighting guide is non-rectangular.

7. The package of claim 4 further comprising an information carrier associated with said capture member, said information carrier bearing external indicia of said image transmogrification.

8. The image capture package of claim 1 wherein said reticle is a transparent overlay.

9. The package of claim 1 further comprising an information carrier associated with said capture member, said information carrier bearing external indicia of said image transmogrification.

10. The package of claim 9 wherein said image transmogrification includes image aberration.

11. The package of claim 10 wherein said image transmogrification includes color remapping.

12. The package of claim 9 further characterized as a one-time-use camera.

13. The package of claim 9 wherein said capture member is a film cassette.

14. The package of claim 9 wherein said capture member is a digital capture member.

15. A one-time use camera comprising:
    a case bearing indicia for a region of localized image transmogrification;
    a photographic filmstrip disposed in said case, said filmstrip bearing an encodement for said region of localized image transmogrification;
    a taking lens defining an image plane in said case;
    a viewfinder defining a viewfinder field aligned with an object plane of said taking lens; and
    a reticle fixed in said viewfinder, said reticle having a sighting guide demarcating said viewfinder field into a viewable transmogrification region and a viewable background region.

16. The one-time use camera of claim 15 wherein said sighting guide is non-rectangular.

17. The one-time use camera of claim 15 wherein said image transmogrification includes image aberration.

18. The one-time use camera of claim 15 wherein said image transmogrification includes color remapping.

19. The one-time use camera of claim 15 wherein said transmogrification region is inset relative to said background region.

20. A photography system comprising:
    a plurality of image capture packages, each package including:
      an information carrier bearing a external indicia of a different image transmogrification; and
      a capture member associated with said information carrier, said capture member bearing a machine readable encodement for the respective said image transmogrification, said capture member capturing captured images free of said image transmogrification; and a processing unit including:
- a reader reading said encodements and generating respective image alteration signals;
- an image processor receiving said images, and, responsive to respective said image alteration signals, digitally transmogrifing said images in accordance with respective said indicia.

21. The system of claim 20 wherein said captured images are latent images on film and said processing unit further comprises a transfer device receiving said captured images and generating a corresponding series of digital images.

22. The system of claim 20 wherein at least some of said image transmogrifications are localized.

23. The system of claim 20 wherein at least some of said image transmogrifications include localized anamorphic distortion.

24. The system of claim 20 wherein said image capture packages are one-time-use cameras.

25. The system of claim 24 wherein said digitally transmogrifying said images in accordance with respective said indicia, digitally transmogrifies localized regions of said images and said cameras each have a viewfinder component defining a field of view for said captured images and a sighting guide within said field of view demarcating said localized regions.

26. The system of claim 25 wherein said viewfinder component defines a periphery of said field of view and said sighting guide is inset from said periphery.

27. The system of claim 26 wherein said sighting guide is non-rectangular.

28. An image capture package comprising:
- photographic film bearing a prerecorded encodement for an image transmogrification, said photographic film capturing images free of said image transmogrification;
- an information carrier associated with said photographic film, said information carrier bearing external indicia of said image transmogrification; and
- a reticle associated with said photographic film, said reticle having a sighting guide demarcating, at the same time, a viewable transmogrification region of said images subject to said image transmogrification and a viewable background region of said images free from said image transmogrification.

29. The image capture package of claim 28 further comprising a viewfinder joined to said information carrier, said reticle being fixed in said viewfinder.

30. A one-time use camera comprising:
- a case bearing indicia for a region of localized image transmogrification;
- a photographic filmstrip disposed in said case, said filmstrip bearing an encodement for said region of localized image transmogrification;
- a viewfinder defining a viewfinder field; and
- a reticle fixed in said viewfinder, said reticle having a sighting guide demarcating said viewfinder field into a viewable transmogrification region and a viewable background region.

* * * * *